(12) United States Patent
Sutter, Jr. et al.

(10) Patent No.: US 7,717,516 B2
(45) Date of Patent: May 18, 2010

(54) ARTICULATING/FOLDING HEAD RESTRAINT

(75) Inventors: Robert R. Sutter, Jr., Belmont, MI (US); Bradley D. Miller, Jenison, MI (US); Brian C. Leja, Grand Rapids, MI (US)

(73) Assignee: Gill Industries, Inc., Grand Rapids, MI (US)

( * ) Notice: Subject to any disclaimer, the term of this patent is extended or adjusted under 35 U.S.C. 154(b) by 0 days.

(21) Appl. No.: 11/693,921

(22) Filed: Mar. 30, 2007

(65) Prior Publication Data

US 2008/0238173 A1 Oct. 2, 2008

(51) Int. Cl.
*A47C 7/36* (2006.01)

(52) U.S. Cl. .................... 297/403; 297/408

(58) Field of Classification Search ........... 297/403, 297/408
See application file for complete search history.

(56) References Cited

U.S. PATENT DOCUMENTS

| | | | |
|---|---|---|---|
| 3,008,766 A * | 11/1961 | Bontempi et. al. | 297/403 |
| 4,678,232 A * | 7/1987 | Ishida et al. | 297/408 |
| 4,711,494 A * | 12/1987 | Duvenkamp | 297/403 |
| 5,238,295 A * | 8/1993 | Harrell | 297/408 |
| 5,590,933 A * | 1/1997 | Andersson | 297/408 |
| 5,992,937 A * | 11/1999 | Pilhall | 297/408 |
| 6,935,696 B2 | 8/2005 | Gauthier et al. | |
| 7,322,646 B2 * | 1/2008 | Jammalamadaka et al. | 297/216.12 |
| 7,325,877 B2 * | 2/2008 | Brockman et al. | 297/408 |
| 7,543,891 B2 * | 6/2009 | Chung | 297/408 |
| 2005/0029853 A1 * | 2/2005 | Gauthier et al. | 297/408 |
| 2005/0052065 A1 * | 3/2005 | Rothstein et al. | 297/403 |
| 2005/0067874 A1 * | 3/2005 | Kamrath et al. | 297/408 |
| 2005/0179301 A1 * | 8/2005 | Clark et al. | 297/408 |
| 2005/0225146 A1 * | 10/2005 | Sutter et al. | 297/408 |
| 2005/0242640 A1 | 11/2005 | Barko et al. | |
| 2005/0264078 A1 * | 12/2005 | Saberan | 297/408 |
| 2006/0022498 A1 | 2/2006 | Freijy | |
| 2006/0061187 A1 * | 3/2006 | Gauthier et al. | 297/408 |
| 2006/0226689 A1 * | 10/2006 | Linnenbrink et al. | 297/408 |
| 2007/0152487 A1 * | 7/2007 | Brockman et al. | 297/408 |
| 2007/0236069 A1 * | 10/2007 | Chung | 297/408 |

FOREIGN PATENT DOCUMENTS

WO    WO 2005113286 A1 * 12/2005

* cited by examiner

*Primary Examiner*—David Dunn
*Assistant Examiner*—James Alex
(74) *Attorney, Agent, or Firm*—Butzel Long (57) ABSTRACT

Articulating/folding head restraint assemblies that include modular brackets that function as modules and allow for platformability and customization by varying auxiliary components. The modular brackets can be molded or cast using conventional manufacturing processes, and are designed to receive and/or house various components of the assembly such as pivotal head restraint supports, pivotal shafts, locking assemblies, etc. The modular brackets are designed to integrate a number of components that are typically separate in prior art devices and have to be individually assembled together.

34 Claims, 8 Drawing Sheets

FIG. 8

ARTICULATING/FOLDING HEAD RESTRAINT

TECHNICAL FIELD

The present invention relates generally to vehicle head restraints and more particularly to articulating vehicle head restraints.

BACKGROUND ART

Head restraints protect vehicle occupants from suffering serious injury due to sudden movement of the vehicle. Head restraints typically extend upward from the top of a vehicle seat and are anchored within the seat assembly.

While head restraints are necessary in order to insure the safety of passengers, at times the head restraints can present difficulties. For example, head restraints can obstruct a driver's view when looking rearward. Also, if a seat is folded forward to allow a passenger to enter the rear portion of a vehicle, a head restraint may contact an object in front of the seat thus stopping the seat from fully folding down. In vehicles with seats that fold flat into the floor, head restraints must be removed or additional stowage space in the floor of the vehicle must be provided.

U.S. Pat. No. 6,935,696 to Gauthier et al. discloses an articulating head restraint that pivots between an up right and a folded position and includes a cam having a lock acumination and a stop acumination. The cam is under a biasing force of a torsion spring and interacts with slide to lock the head restraint in the upright position.

While foldable head restraints offer advantages over non-foldable head restraints, foldable head restraints are generally more difficult to assemble and therefore relatively more expensive.

The present invention provides an articulating head restraint that is designed to have fewer components that require individual assembling and which can allows for platformability by standardizing a component set while allowing customization by varying auxiliary components.

DISCLOSURE OF THE INVENTION

According to various features, characteristics and embodiments of the present invention which will become apparent as the description thereof proceeds, the present invention provides an articulating head restraint assembly that includes:

a pair of head restraint supports having metal substrates on lower ends thereof;

a pivot shaft having opposite ends which are coupled to the metal substrates of the pair of head restraint supports;

a locking assembly that engages one of the metal substrates of the pair of head restraint supports; and a modular bracket for mounting the head restraint assembly to a vehicle seat, said modular bracket being configured to receive the pivot shaft and locking assembly therein.

The present invention further provides an improvement over prior art vehicle head restraint systems that comprise a head restraint that pivots about a rotatable shaft between a upright and a folded position and includes head restraint supports coupled to the rotatable shaft and a locking assembly for locking the head restraint in the upright position, wherein the improvement comprises a modular bracket for mounting the head restraint system to a vehicle seat and for receiving and containing the rotatable shaft and at least a portion of the locking assembly and for supporting the head restraint supports.

BRIEF DESCRIPTION OF THE DRAWINGS

The present invention will be described with reference to the attached drawings which are given as non-limiting examples only, in which.

BEST MODE FOR CARRYING OUT THE INVENTION

The present invention is directed to articulating heat restraints that are designed to have fewer components that would normally require individual assembling. The design of the articulating head restraint according to the present invention includes unique brackets that function as modules and allow for platformability and customization by varying auxiliary components. The unique brackets or modules can be molded or cast using conventional manufacturing processes, and are designed to receive and/or house various components of the assembly as described herein, the brackets or modules are designed to integrate a number of components that are typically separate in prior art devices and have to be individually assembled together.

Customization for the articulating head restraint assemblies for different vehicles and vehicle seats can be achieved without making changes to the brackets or modules, thus allowing standardization of the brackets or modules. Any necessary customization can be achieved by modification of the components/elements that are coupled to the brackets or modules, such as the metal substrates of the head restrain supports or the head restraint supports themselves.

Figure 1:
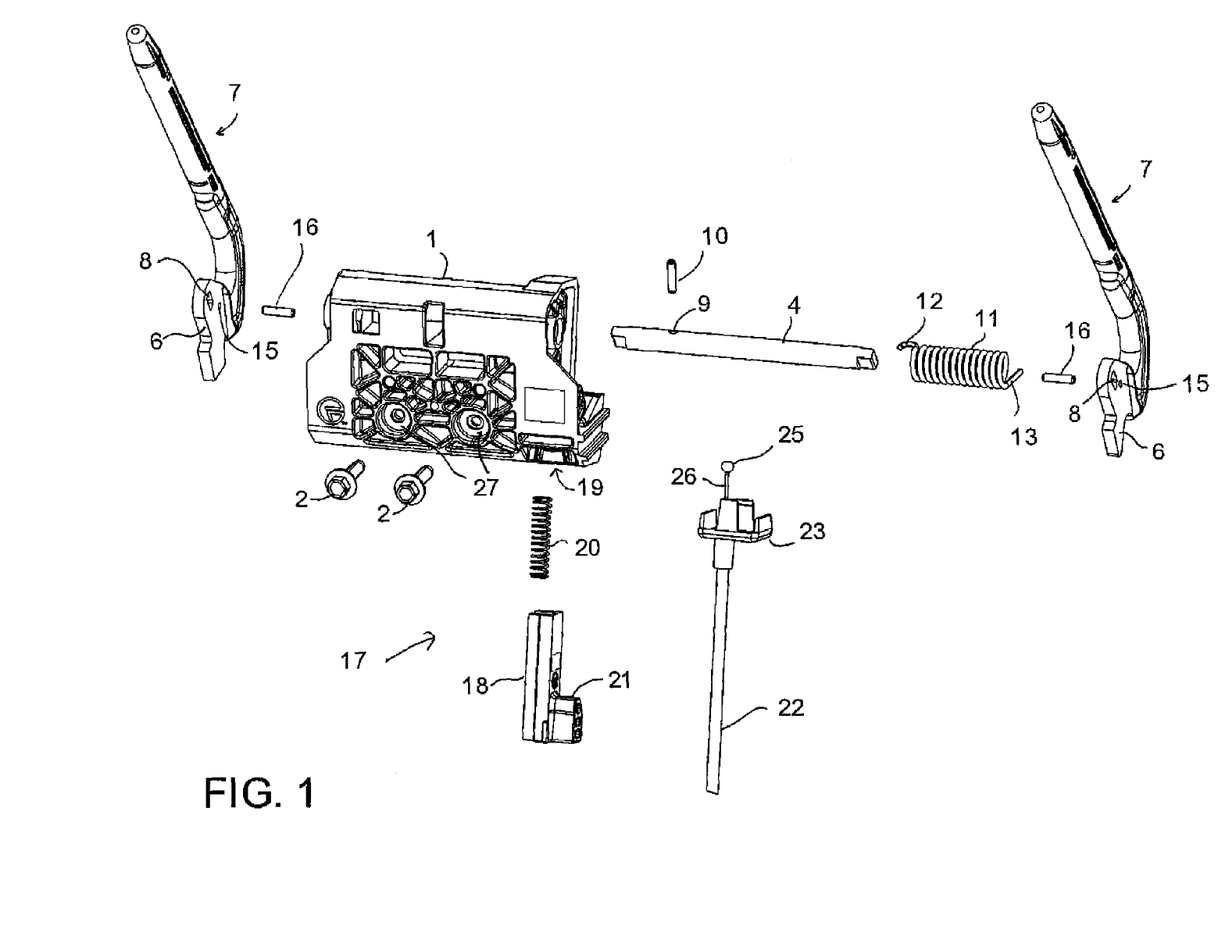
FIG. 1 is a perspective exploded view of a head restraint assembly according to one embodiment of the present invention.

FIG. 1 is a perspective exploded view of a head restraint assembly according to one embodiment of the present invention. The head restraint assembly includes a bracket 1 that receives and/or houses various components of the assembly as described herein. In addition, the bracket 1 is used to mount the head restraint assembly internally within a seat back containing suitable reinforcing structure to which the bracket 1 can be mounted. The bolts 2 shown in FIG. 1, or other suitable fasteners, can be used to attach the bracket 1 to reinforcing structure within a seat back. The upper portion of the bracket 1 includes a passageway 3 (See FIG. 4) that receives pivot shaft 4 therein. The passageway 3 includes bushings 5 on opposite sides through which opposite ends of the pivot shaft 4 extend for rotational movement of the pivot shaft 4 within the passageway 3.

The ends of the pivot shaft 3 are keyed so as to be non-rotatably coupled to metal substrates 6 provided at the lower ends of head restraint supports 7. The head restraint supports 7 are shown as including an over-molded geometry that is contained within a head restraint bun The over-molded geometry, which can be made of a lighter material such as a plastic material, allows for a reduction, or even elimination, of the slots that are normally required for such folding head restraints. As shown in FIG. 1, the ends of the pivot shaft 3 can be cut or machined to have parallel planar surfaces and the metal substrates 6 can be provided with complimentarily shaped bores 8 into which the "keyed" ends of the pivot shaft 3 can be inserted. It is to be understood that the configuration of the "keyed" structure is not specifically limited to that shown. The ends of the pivot shaft 3 could be configured to have any geometric or non-geometric shape and the bore 8 provided in the metal substrates 6 could have any corresponding complimentarily shape.

The pivotal shaft 3 includes a radially aligned bore 9 which is configured to receive a pin 10. The pin 10 is provided for the purpose of catching and securing one end of torsion spring 11 thereon. The torsion spring 11 has a hook-shaped end 12 that is configured to catch pin 10. The other end of torsion spring 11 has a tangential extension 13 which is configured to be caught against a ledge or plate 14 that is formed in or provided on bracket 1 (See FIG. 5). The torsion spring 11 applies a biasing force that tends to cause the head restraint supports 7 (and the pivot shaft 3) to rotate into their retracted or folded position shown in FIG. 7.

The metal substrates 6 provided at the lower ends of head restraint supports 7 include pin stop bores 15 into which pin stops 16 are received. The pin stops 16 extend inwardly from metal substrates 6 and are aligned so as to limit the upward rotation of the head restraint supports 7 by abutting a structure or wall that is formed in or provided on the bracket 1 in a suitable location. For example, the pin stops 16 could move along a slot formed in ends of the bracket 1 or could be positioned to abut a stop that extends from the rear wall of the bracket 1.

The head restraint assembly is provided with a locking assembly 17 that includes a sliding lock element 18 that is received in a chamber 19 that is provided in the bottom of bracket 1 adjacent to the position where the metal substrate 6 of one of the head restraint supports 7 is located. The locking assembly 17 further includes a spring element 20 that is received in a hollow top portion of sliding lock element 18. The opposite ends of the spring element 20 are coupled between the sliding lock element 18 and upper portion of chamber 19 so that tension in spring element 20 urges the sliding lock element 18 upward. That is, the sliding lock element 18 is normally biased upward so as to be in a locked position as described in detail below.

The sliding lock element 18 includes a lock abutment 21 that extends outward so as to engage an adjacent metal substrate 6 as discussed in more detail below.

The locking assembly 17 is further provided with a release activation mechanism that includes a release cable 22 that is coupled to a connector 23, which connector 23 is configured to be received in or over the bottom of chamber 19. The connector 23 secures the sheath 24 of the release cable 22 relative to the bracket 1 and allows the end 25 of the central cable element 26 to slide within chamber 19. The end 25 of the central cable element 26 is coupled to the sliding lock element 18 (See FIG. 8) so that when the central cable element 26 is pulled, the sliding lock element 18 is pulled downward in chamber 19 against the biasing force of spring element 20.

Figure 2:
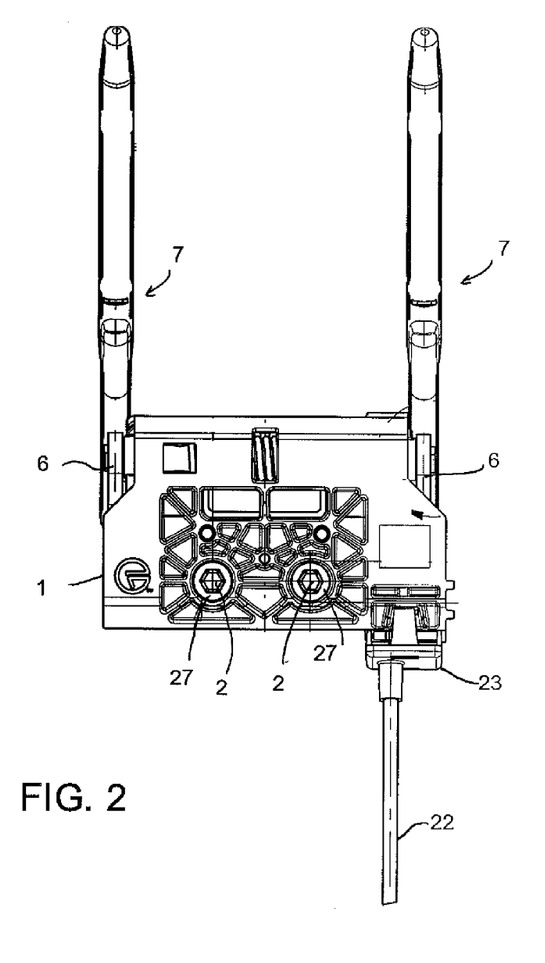
FIG. 2 is a front planar view of a head restraint assembly according to one embodiment of the present invention with the head restraint supports in their upright positions.
Figure 3:
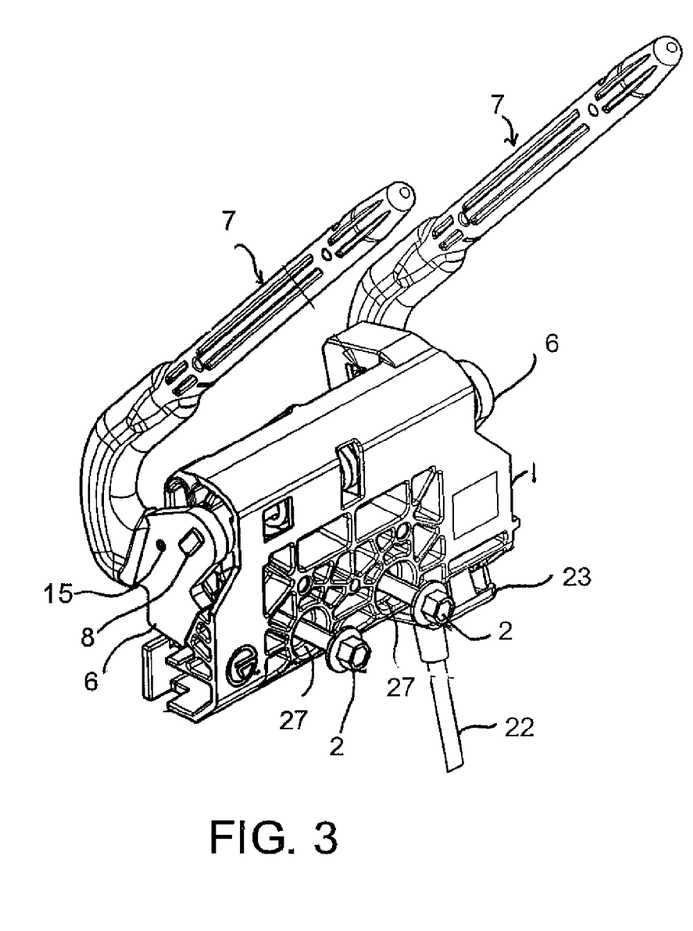
FIG. 3 is a front prospective view of a head restraint assembly according to one embodiment of the present invention with the head restraint supports in their upright positions.
Figure 4:
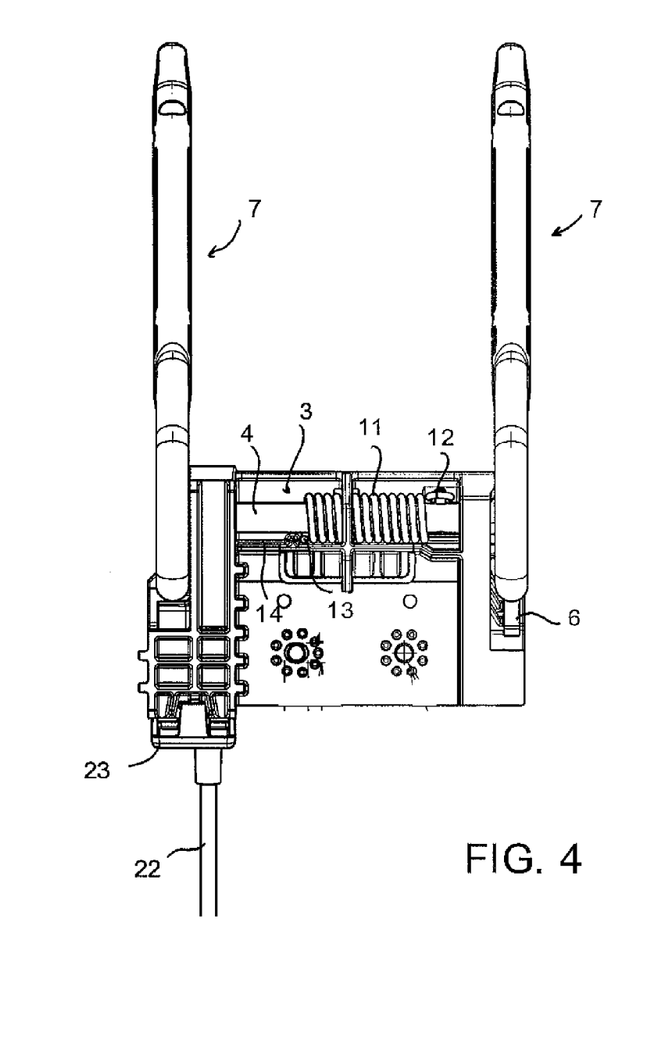
FIG. 4 is a rear planar view of a head restraint assembly according to one embodiment of the present invention with the head restraint supports in their upright positions
Figure 5:
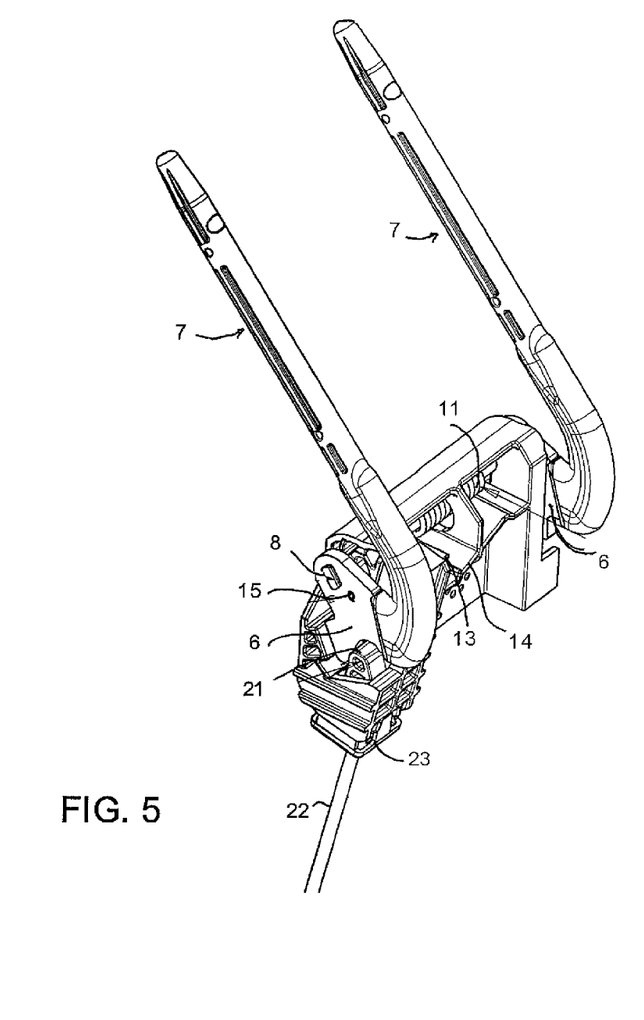
FIG. 5 is a rear prospective view of a head restraint assembly according to one embodiment of the present invention with the head restraint supports in their upright positions.

FIG. 2 is a front planar view of a head restraint assembly according to one embodiment of the present invention with the head restraint supports in their upright positions. FIG. 3 is a front prospective view of a head restraint assembly according to one embodiment of the present invention with the head restraint supports in their upright positions. FIG. 4 is a rear planar view of a head restraint assembly according to one embodiment of the present invention with the head restraint supports in their upright positions. FIG. 5 is a rear prospective view of a head restraint assembly according to one embodiment of the present invention with the head restraint supports in their upright positions.

As shown in FIGS. 2-5 the bracket 1 is configured to be light weight and structurally reinforced as necessary with a pattern of reinforcing web structures. Particular reinforced areas that are visible in the front view are around the threaded bolt holes 27. The areas around the locking assembly 17, the passageway 3 and the side ends of the bracket 1 are also reinforced.

As can be understood from the depicted views of the bracket 1, the bracket 1 can be produced by a molding or casting process and made from any suitable metal, alloy, plastic material, composition, etc. The rear of the bracket 1 is generally open for access and assembly. That is, the rear of the bracket 1 along the passageway 3 is open as depicted so that the torsion spring 11 can be positioned within passageway 3 to receive pivot shaft 4 therethrough during assembly.

FIG. 4 depicts how the hook-shaped end 12 of the torsion spring 11 is configured to be caught by pin 10 while FIGS. 4 and 5 depict how the tangential extension 13 at the opposite end of the torsion spring 11 is configured to be caught against a ledge or plate 14 that forms the bottom of passageway 3. FIGS. 2-5 each depict how the connector 23 of the locking assembly 17 is configured to be received in or over the bottom of chamber 19.

Figure 7:
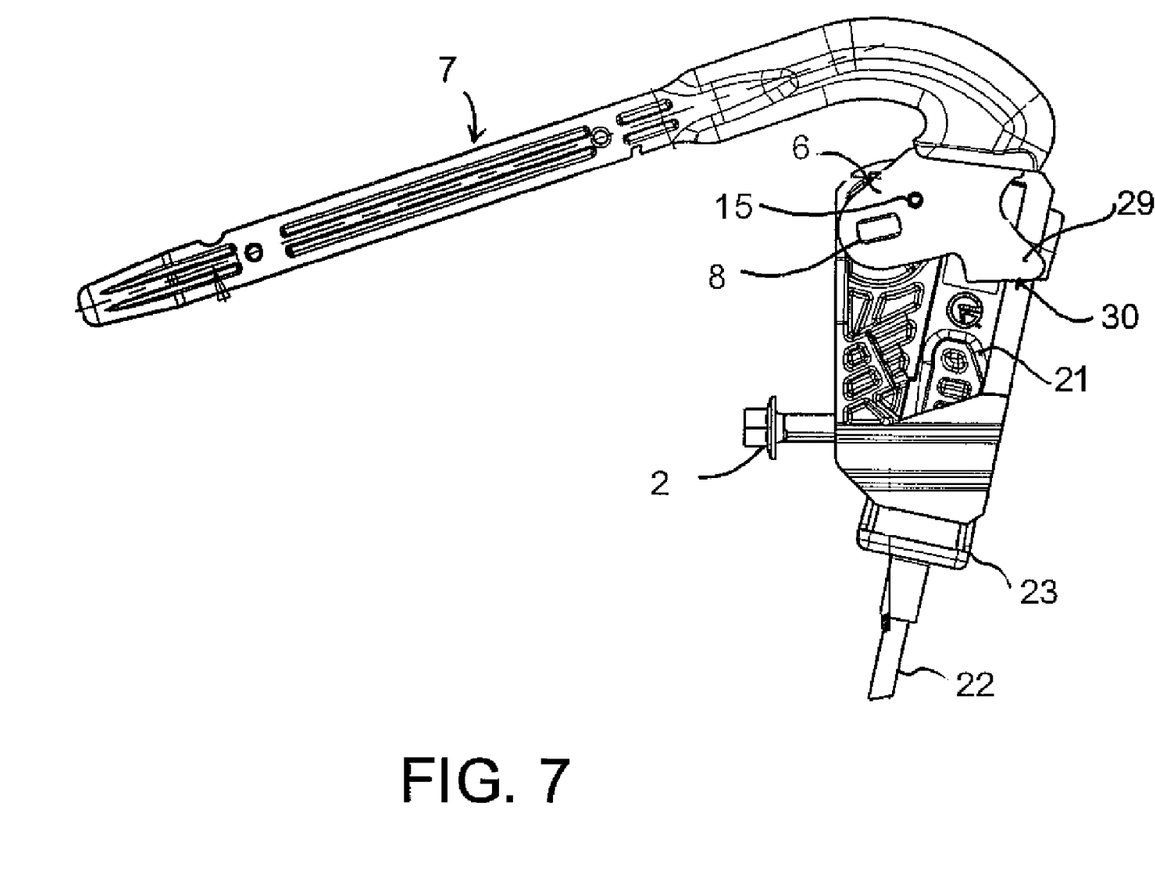
FIG. 7 is a planar side view of a head restraint assembly according to one embodiment of the present invention which depicts the head restraint support(s) in their retracted or folded position.

FIG. 5 depicts how the lock abutment 21 that extends outward from the sliding lock element 18 is configured to engage metal substrate 6 and prevent rotation of the head restraint supports 7 (and pivot shaft 4) from the upright position to the retracted or folded position shown in FIG. 7. As show, and discussed further below, the metal substrate 6 of the head restraint support 7 is configured to receive and engage lock abutment 21. That is, the rear portion of the metal substrate 6 has a curved or arch-shaped cut-out or notch 28 that is sufficiently complimentarily shaped to the lock abutment 21 to receive and engage the lock abutment 21 so as to prevent rotation of the head restraint supports 7 (and pivot shaft 4) from the upright position to the retracted or folded position shown in FIG. 7. From FIG. 5 is can be understood that when the release activation mechanism of the locking assembly 17 is activated, i.e. by pulling the central cable element 26 downward, the sliding lock element 18 is pulled downward in chamber 19 against the biasing force of tension spring 20 together with the lock abutment 21 so as to disengage the lock abutment 21 from the curved or arch-shaped cut-out or notch 28 formed in metal substrate 6, thereby releasing the metal substrate 6 and allowing rotation of the head restraint support (s) 7 (and pivot shaft 4) downward into the retracted or folded position (rotation in the opposite direction is essentially limited by the pin stops 16).

Figure 6:
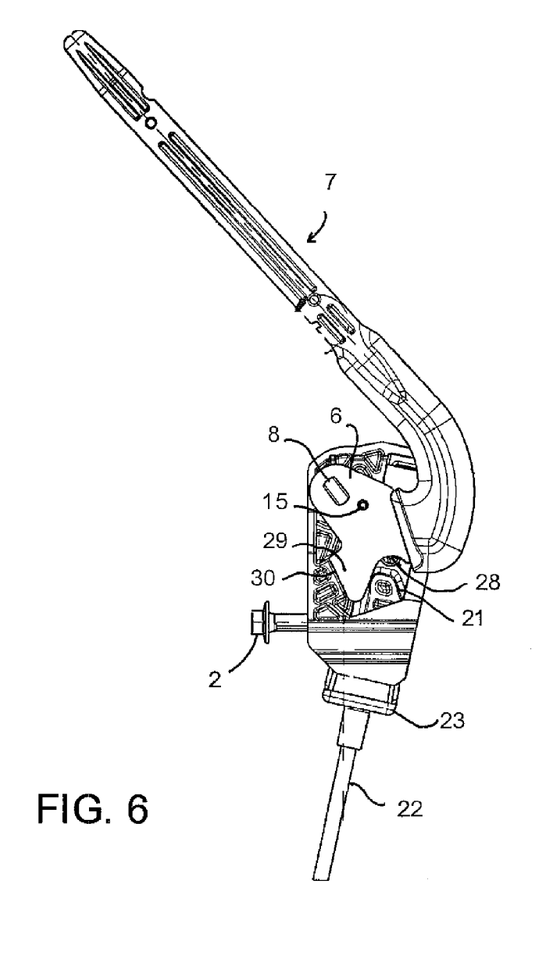
FIG. 6 is a planar side view of a head restraint assembly according to one embodiment of the present invention which depicts the head restraint support(s) in their upright position.

FIG. 6 is a planar side view of a head restraint assembly according to one embodiment of the present invention which depicts the head restraint support(s) in their upright position. FIG. 7 is a planar side view of a head restraint assembly according to one embodiment of the present invention which depicts the head restraint support(s) in their retracted or folded position. In FIG. 6 the engagement of the lock abutment 21 within the curved or arch-shaped cut-out or notch 28 formed in metal substrate 6 is shown and is similar to the depiction in FIG. 5 which is discussed in detail above. In this "locked" position, the head restraints 7 (and pivot shaft 4) cannot be rotated counter clockwise FIG. 7 depicts the release mechanism of the locking assembly as being activated, i.e. by pulling the central cable element 26 downward, and causing the sliding lock element 18 to be pulled downward in chamber 19 against the biasing force of spring element 20 together with the lock abutment 21 so as to disengage the lock abutment 21 from the curved or arch-shaped cut-out or notch 28 formed in metal substrate 6, thereby releasing the metal substrate 6 and allowing rotation of the head restraint support(s) 7 (and pivot shaft 4) counter clockwise into the retracted or folded position under influence of the force of spring element 11.

Once the central cable element 26 is released (i.e. no longer pulled) the biasing force of spring element 20 causes the sliding element 18 to move upward in chamber 19 which causes the lock abutment 21 to move back into the position depicted in FIG. 6.

To restore the head restraint to the upright position, one merely pushes and rotates the head restraint (and head restraint support 7) clockwise in FIG. 7 against the force of spring element 11. As the head restraint support 7 rotates clockwise, metal substrate 6 attached thereto also rotates clockwise. As shown in the various figures, the metal substrate 6 is provided with a leg 29. Leg 29 has a cam surface 30 which is configured to engage the lock abutment 21 and push the lock abutment 21 downward against the biasing force of spring element 20 until leg 29 passes over the lock abutment 21. After the leg 29 of the metal substrate 6 passes over or clears the lock abutment 21, the lock abutment 21 is pulled upward by the biasing force of spring element 20 into the "locked" position shown in FIG. 6, with the head restraints 7 in their upright position.

Figure 8:
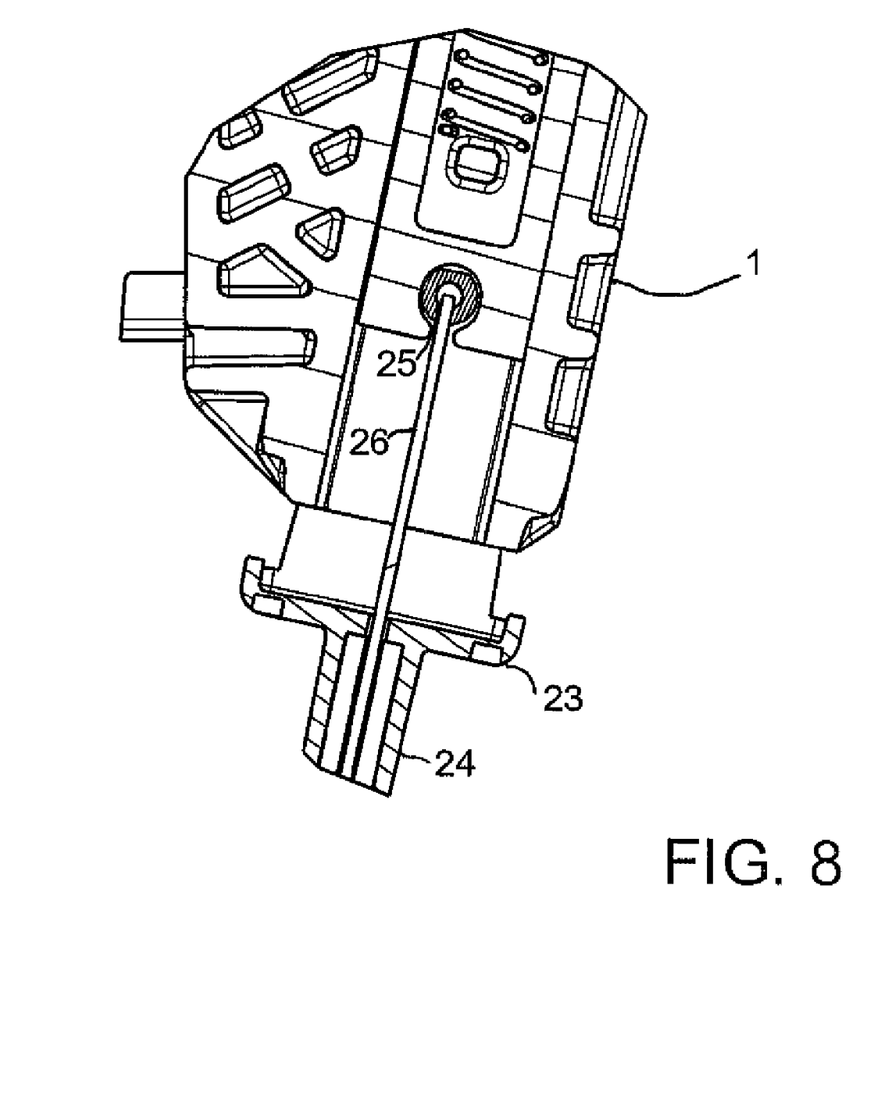
FIG. 8 is a cross-sectional side view that depicts details of the release activation mechanism.

FIG. 8 is a cross-sectional side view that depicts details of the release activation mechanism. As shown in FIG. 8, connector 23 secures the sheath 24 of the release cable 22 relative to the bracket 1. The end 25 of the central cable element 26 is coupled to the sliding lock element 18 so that when the central cable element 26 is pulled, the sliding lock element 18 is pulled downward in chamber 19 against the biasing force of spring element 20.

It is to be understood that any means can be used to effect the pulling of central cable element 26, including a lever located in a convenient location on the seat and/or in a remote location that is convenient for the driver, or a push button, a pull knob, etc. In alternative embodiments a motorized or electronic means could be used to pull the central cable element 26 or slide lock element 18 downward, including an electric motor, solenoid, or other type of electric actuators and/or mechanism.

The components of the head restraint assembly can be made from conventional materials, with the bracket made from moldable or castable materials as indicated above. A conventional bun (not shown) can be attached to the head restraint 7 supports in a conventional manner. The "keyed" ends of the pivot shaft 4 can be pressed into the complimentarily shaped bores 8 provided in the metal substrates 6. Likewise, the pin stops 16 can be pressed into the pin stop bores 15. In alternative embodiments, other types of mechanical fasteners and/or welding could be used in the assembly of the various elements.

The articulating head restraints of the present invention are designed to have fewer components that require individual assembling. Moreover, the design of the articulating head restraints, including the unique brackets allows for platform-ability and customization by varying auxiliary components such as the configuration of the metal substrates.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. An articulating head restraint assembly that comprises:
a pair of head restraint supports having substrates on lower ends thereof;
a pivot shaft having opposite ends which are coupled to the substrates of the pair of head restraint supports;
a locking assembly that engages one of the substrates of the pair of head restraint supports; and
a bracket for mounting the head restraint assembly to a vehicle seat, said bracket extending and between the pair of head restraint supports and housing the pivot shaft and locking assembly therein, the bracket terminating in opposite sides proximate which the opposite ends of the pivot shaft are coupled to the substrates, such that the pair of head restraint supports are disposed exteriorly of the opposite sides of, and so not captured between any portion of, the bracket.

2. An articulating head restraint assembly according to claim 1, wherein the bracket comprises one of a cast or molded article.

3. An articulating head restraint assembly according to claim 1, wherein the bracket includes a passageway through which the pivot shaft extends.

4. An articulating head restraint assembly according to claim 3, wherein the opposite ends of the pivot shaft extend beyond the opposite sides of the bracket.

5. An articulating head restraint assembly according to claim 4, wherein the substrates of the pair of head restraint supports are coupled to the opposite ends of the pivot shaft extending beyond the sides of the bracket.

6. An articulating head restraint assembly according the claim 1, wherein the locking assembly includes a movable lock abutment and at least one of the substrates of the pair of head restraint supports is configured to be engaged by the movable lock abutment so that when engaged, the head restraint supports are prevented from rotating about an axis of the pivot shaft.

7. An articulating head restraint assembly according to claim 6, wherein the movable lock abutment is biased into a locking position in which the movable lock abutment can engage the at least one of the substrates of the pair of head restraint supports.

8. An articulating head restraint assembly according to claim 7, wherein the at least one substrate of the pair of head restraint supports includes a cam surface which engages the movable lock abutment when the pair of head restraint supports are rotated about the axis of the pivot shaft into an upward position.

9. An articulating head restraint assembly according to claim 1, wherein the locking assembly includes a movable lock element that is movable within the modular bracket.

10. An articulating head restraint assembly according to claim 9, wherein the movable lock element includes a lock abutment and at least one of the substrates of the pair of head restraint supports is configured to be engaged by the movable lock abutment so the when engaged, the lead restraint supports are prevented from rotating about an axis of the pivot shaft.

11. An articulating head restraint assembly according to claim 9, wherein the movable lock element is slidably movable within the bracket.

12. An articulating head restraint assembly according to claim 9, wherein the locking assembly comprises a remote release actuator.

13. An articulating head restraint assembly according to claim 12, wherein the remote release actuator comprises a cable release.

14. An articulating head restraint assembly according to claim 3, further including a torsion spring that is coupled to the pivotal shaft.

15. An articulating head restraint assembly according to claim 1, wherein the substrate of each head restraint support is metal, and wherein further each metal substrate is over-molded with a non-metal material.

16. An articulating head restraint assembly according to claim 15, wherein the non-metal material is plastic.

17. An articulating head restraint assembly according to claim 1, wherein the bracket is monolithic.

18. An articulating head restraint assembly according to claim 17, wherein the monolithic bracket has defined thereon at least one integral stop surface, each at least one stop surface being abutted by the substrate of a head restraint support when the pair of head restraint supports are rotated about an axis of the pivot shaft into an upward position.

19. An articulating head restraint assembly according to claim 1, wherein at least one of the head restraint supports includes a pin stop extending therefrom and toward the bracket, the pin stop abutting a structure defined on the bracket when the pair of head restraint supports are rotated about an axis of the pivot shaft into an upward position.

20. An articulating head restraint assembly according to claim 10, wherein the lock abutment is integral with the moveable lock element, and the moveable lock element and lock abutment are slidably received within a chamber defined in the bracket.

21. An articulating head restraint assembly according to claim 20, wherein the moveable lock element and lock abutment form a monolithic structure.

22. An articulating head restraint assembly according to claim 20, wherein the moveable lock element and lock abutment are selectively removable from the bracket.

23. In a vehicle head restraint system that comprises a head restraint that pivots about a rotatable shaft between an upright and a folded position and includes head restraint supports coupled to the rotatable shaft and a locking assembly for locking the head restraint in the upright position, the improvement which comprises a bracket for mounting the head restraint system to a vehicle seat, the bracket extending between the head restraint supports and housing the rotatable shaft and at least a portion of the locking assembly and supporting the head restraint supports, and the bracket terminating in opposite sides proximate which opposite ends of the rotatable shaft are coupled to the head restraint supports such that the head restraint supports are disposed exteriorly of the opposite sides of, and not captured between any portion of, the bracket; and wherein the locking assembly includes a moveable lock element having an integral lock abutment engageable with at least one of the head restraint supports to prevent the head restraint from pivoting about the rotatable shaft, and wherein further the moveable lock element and lock abutment are slidably received within a chamber defined in the bracket.

24. The vehicle head restraint system according to claim 23, wherein the bracket comprises one of a cast or molded article.

25. The vehicle head restraint system according to claim 23, wherein the opposite ends of the rotatable shaft extend beyond the opposite sides of the bracket.

26. The vehicle head restraint system according to claim 25, wherein the head restraint supports are coupled to the rotatable shaft and located adjacent the opposite sides of the bracket.

27. The vehicle head restraint system according to claim 23, wherein the locking assembly includes a remote release mechanism that extends outward from the bracket.

28. The vehicle head restraint system according to claim 23, wherein each head restraint support comprises a metal substrate over-molded with a non-metal material.

29. The vehicle head restraint system according to claim 28, wherein the non-metal material is plastic.

30. The vehicle head restraint system according to claim 23, wherein the bracket is monolithic.

31. The vehicle head restraint system according to claim 30, wherein the monolithic bracket has defined thereon at least one integral stop surface, each at least one stop surface being abutted by a head restraint support when the head restraint supports are pivoted about the rotatable shaft into the upright position.

32. The vehicle head restraint system according to claim 23, wherein at least one head restraint support includes a pin stop extending therefrom and toward the bracket, the pin stop abutting a structure defined on the bracket when the head restraint supports are pivoted about the rotatable shaft into the upright position.

33. The vehicle head restraint system according to claim 23, wherein the moveable lock element and lock abutment form a monolithic structure.

34. The vehicle head restraint system according to claim 23, wherein the moveable lock element and lock abutment are selectively removable from the bracket.

* * * * *